United States Patent [19]

Mottate et al.

[11] Patent Number: 4,854,741

[45] Date of Patent: Aug. 8, 1989

[54] HOLDING DEVICE OF RECTILINEAR MOTION ROLLING GUIDE UNIT

[75] Inventors: Tatsuo Mottate, Mitaka; Toshiaki Geka, Shiroimachi, both of Japan

[73] Assignee: Nippon Thompson Co., Ltd., Tokyo, Japan

[21] Appl. No.: 216,208

[22] Filed: Jul. 7, 1988

[30] Foreign Application Priority Data

Oct. 26, 1987 [JP] Japan .............................. 62-270040

[51] Int. Cl.$^4$ ............................................. F16C 29/06
[52] U.S. Cl. ..................................................... 384/45
[58] Field of Search ............................. 384/43, 44, 45; 464/168

[56] References Cited

U.S. PATENT DOCUMENTS

| 4,253,709 | 3/1981 | Teramachi | 384/45 |
| 4,610,488 | 9/1986 | Geka | 384/45 |
| 4,662,763 | 5/1987 | Itoh | 384/45 |

FOREIGN PATENT DOCUMENTS

| 0038216 | 2/1986 | Japan | 384/45 |
| 0266823 | 11/1986 | Japan | 384/43 |
| 2194992 | 3/1988 | United Kingdom | 384/43 |

*Primary Examiner*—Thomas R. Hannon
*Attorney, Agent, or Firm*—L. Lawton Rogers, III; Joseph M. Killeen

[57] ABSTRACT

A holding device of a rectilinear motion rolling guide unit comprises: a long rail; first track grooves formed on both side wall surfaces in the longitudinal direction of the rail; a saddle-shaped slide unit formed with an inner concave portion and slidably mounted on the rail; second track grooves formed on the surface of the inner concave portion at the positions opposite to the first track grooves; and balls inserted between the first and second track grooves, thereby enabling the slide unit to be slidably moved on the rail therealong through the rolling of the balls. A holding portion to hold the balls is formed at the edge surface on the bottom surface side of the inner concave portion of each second track groove so as to be projected to the side of the rail by exceeding a perpendicular passing through the center of the ball. A holding plate is formed at the edge surface of the second track groove on the opening side of the inner concave portion in the direction opposite to the holding portion at the position inside of the bisector passing through the center of the ball and dividing the first and second track grooves. The holding plate is fixed to the edge surface of the second track groove so as to be projected to the side of the rail by exceeding the bisector dividing the first and second track grooves. The balls are held by the holding plate and holding portion.

9 Claims, 3 Drawing Sheets

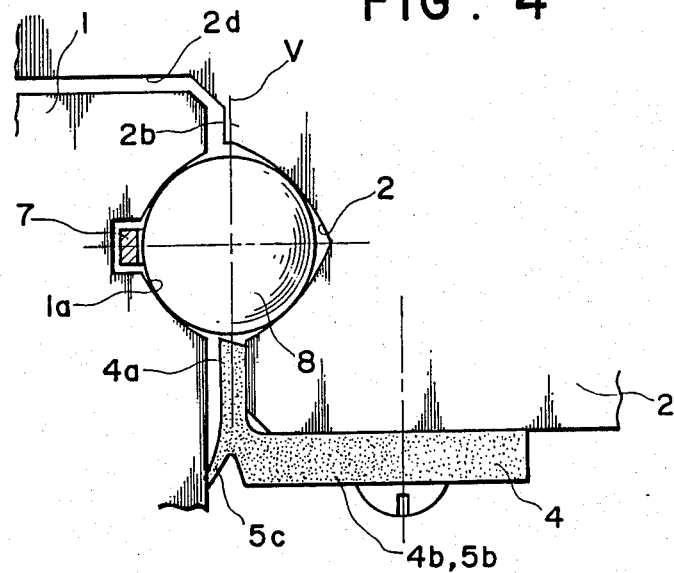
FIG. 4
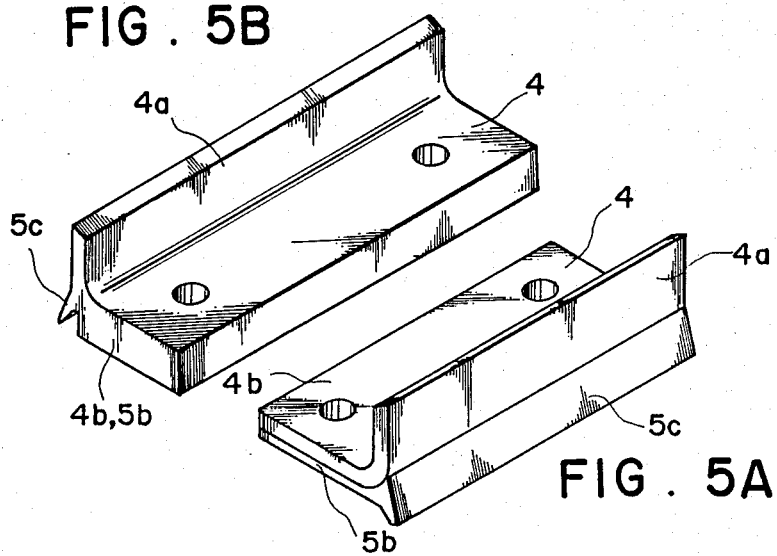
FIG. 5B
FIG. 5A

HOLDING DEVICE OF RECTILINEAR MOTION ROLLING GUIDE UNIT

BACKGROUND OF THE INVENTION

1. Field of the Invention

The present invention relates to a rectilinear motion rolling guide unit in which track grooves are formed on the longitudinal direction of both side wall surfaces of a long member of a rail, a saddle-shaped slide unit on which track grooves are formed at the positions opposite to the track grooves of the rail, a number of rolling members are inserted between the track grooves, and thereby enabling the rail and slide unit to be slidably moved and, more particularly, to a holding device to prevent the falling of the rolling members in the load range.

2. Description of the Related Background Art

Various kinds of methods of holding the rolling members in the load range (between the track grooves) in such a kind of rectilinear motion rolling guide unit have been proposed and these methods have many advantages. However, according to most of these methods, in the case where the rolling members consist of balls, slits (windows) each having a width which is slightly narrower than the diameter of the ball are formed in the flat plate members, thereby holding the balls.

This structure has advantages such that the holding device has the simple shape and can be easily manufactured. However, there are problems such that a positioning error occures between the holding device and the track groove forming member and the holding device is easily deformed by the external force because it is made of a thin plate, and the like. When sliding, the rolling members come into contact with the holding device, so that the slide resistance is increased. When the slide unit is pulled out of the rail, the balls drop.

On the other hand, there has also been proposed a structure such that no holding device is formed and a holding section is provided for the track groove forming member. However, in the case of the structure such that the track grooves are directly formed on the side wall surfaces of the casing, a grindstone to form the track grooves cannot be inserted into the track grooves since the holding portion under the track grooves becomes an obstacle, so that the track surfaces cannot be formed.

SUMMARY OF THE INVENTION

It is an object of the present invention to provide a rectilinear motion rolling guide unit in which the drawbacks of such a conventional holding device of a rectilinear motion rolling guide unit can be solved, track grooves can be easily ground and formed at a high accuracy, rolling members can be certainly held, and this guide unit can be cheaply manufactured.

According to one aspect of the present invention, this object is accomplished by a holding device of a rectilinear motion rolling guide unit, comprising:

a long rail (1);

first track grooves (1a) formed on both side wall surfaces in the longitudinal direction of the rail (1);

a saddle-shaped slide unit (10) which is formed with an inner concave portion (2d) and is slidably mounted on the rail (1);

second track grooves (2a) formed on the surface of the inner concave portion (2d) at the positions opposite to the first track grooves (1a) of the rail (1); and a number of rolling members (8) inserted between the first and second track grooves (1a and 2a) on the rail side and slide unit side, thereby enabling the slide unit (10) to be slidably moved on the rail (1) in the longitudinal direction thereof through the rolling of the rolling members (8), wherein a holding portion (4a) to hold the rolling members (8) is formed at the edge surface on the bottom surface side of the inner concave portion (2d) of each of the second track grooves (2a) formed in the inner concave portion (2d) of the slide unit (10) so as to be projected to the side of the rail (1) by exceeding a perpendicular (v) which passes through the center of the rolling member (8) arranged between the first and second track grooves (1a and 2a), a holding plate (4) is formed at the edge surface of the second track groove (2a) on the opening side of the inner concave portion (2d) in the direction opposite to the holding portion (4a) so as to be located on the inside of a bisector which passes through the center of the rolling member (8) arranged between the first and second track grooves (1a and 2a) and divides the first and second track grooves on the rail side and slide unit side, and the holding plate (4) is fixed to the edge surface of the second track groove (2a) on the opening side of the inner concave portion (2d) so as to be projected to the side of the rail (1) by exceeding the bisector which divides the first and second track grooves (1a and 2a), and the rolling members (8) are held by using at least the holding plate (4) and holding portion (4a) between the first and second track grooves (1a and 2a).

According to the present invention, the holding plate (4) has an almost L-shaped cross section and has the holding portion of the rolling members (8) and an attaching portion (4b), and a lower surface seal (5b) having a seal lip (5c) is integrally fixed to the attaching portion.

According to another aspect of the invention, the holding plate (4) with the lower surface seal (5b) is made of the same material such as elastic plastics by injection molding.

According to the present invention, there are the following advantages.

(1) The track grooves of the casing can be easily ground at a high accuracy and the performance of the rectilinear motion rolling guide unit is improved.

(2) The lower surface seal and the holding device of the rolling members can be formed by a single member, so that the number of parts can be reduced.

(3) The rectilinear motion rolling guide unit can be miniaturized.

(4) The holding device can be cheaply manufactured.

The above and other objects and features of the present invention will become apparent from the following detailed description and the appended claims with reference to the accompanying drawings.

BRIEF DESCRIPTION OF THE DRAWINGS

FIG. 4 is an enlarged diagram of a portion of a holding device in the second embodiment of the invention;

FIG. 5A is a perspective view showing a holding plate of the type in which a lower surface seal in the first embodiment of the invention is separately formed; and FIG. 5B is a perspective view showing a holding plate of the type in which a lower surface seal in the second embodiment of the invention is integrally formed.

DETAILED DESCRIPTION OF THE PREFERRED EMBODIMENTS

An embodiment of the present invention will be described in detail hereinbelow with reference to the drawings.

Figure 1:
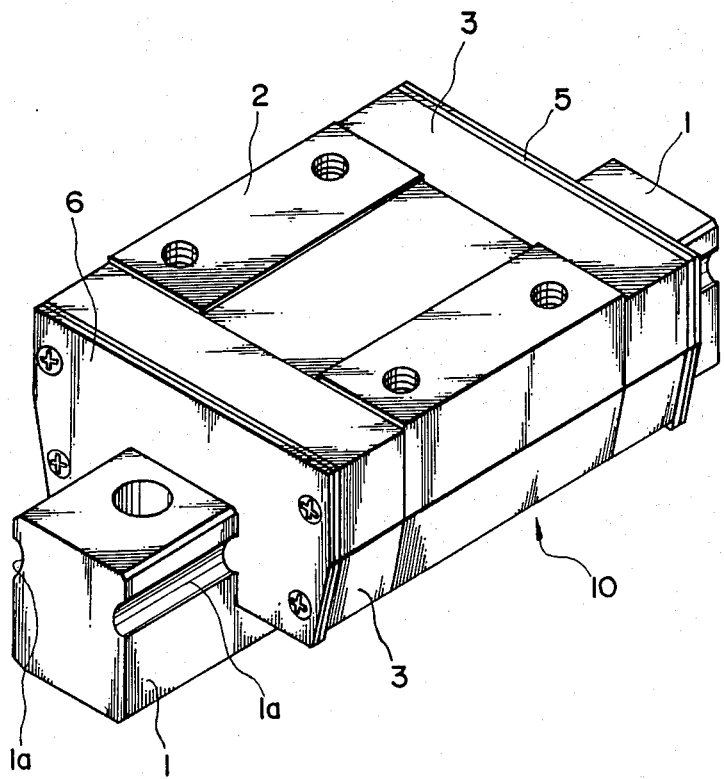
FIG. 1 is a perspective view showing a whole rectilinear motion rolling guide unit having a holding device in the first embodiment of the invention.

FIG. 1 is a perspective view showing a rectilinear motion rolling guide unit in the first embodiment of the invention.

Track grooves 1a are formed in the longitudinal direction of portions of both side wall surfaces of a long member of a rail 1. A slide unit 10 has a U-shaped cross section and consists of a casing 2, side plates 3, and the like. The slide unit 10 is mounted like a saddle onto the rail 1. Thus, the slide unit 10 is slidably moved along the track grooves 1a of the rail 1.

The slide unit 10 is constructed in the following manner. The side plates 3 are attached to both edge surfaces in the slide direction of the saddle-shaped casing 2. Seals 5 and scrapers 6 are further fixed to the outsides of the side plates 3.

Figure 2:
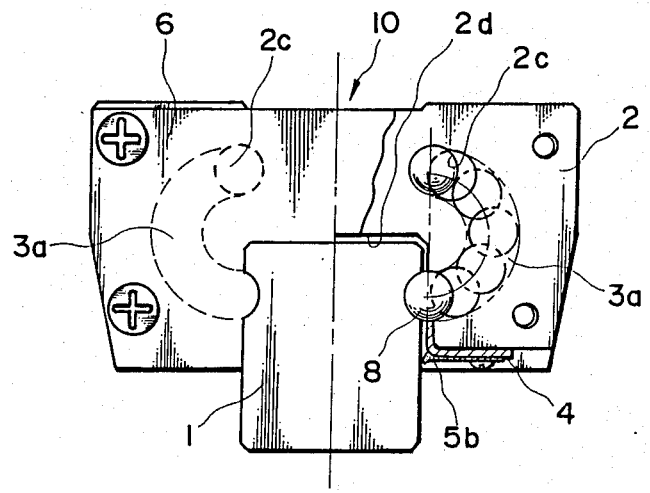
FIG. 2 is a front view of FIG. 1.

FIG. 2 is a front view of FIG. 1. The first embodiment shows the rectilinear motion rolling guide unit of the two-track-groove type in which one track groove is formed on each of the upper side wall surface of the rail 1 and balls are used as the rolling members.

The slide unit side track grooves 2a corresponding to the rail side track grooves 1a are also formed in an inner concave portion 2d of the slide unit, namely, on the inside wall surfaces of the concave portion 2d of the casing 2. A number of balls 8 serving as rolling members are inserted between the track grooves 1a and 2a. The balls 8 in the load range are led toward a direction turning passage 3a formed in each side plate 3. Further, the balls 8 move to return holes 2c which are formed in parallel with the track grooves 2a in the upper portions of the casing 2. In this manner, the balls 8 are endlessly circulated in the endless circulating passage.

The rail 1 and slide unit 10 can relatively slidably move with the aid of the rolling of the load balls 8 arranged between the track grooves 2a of the slide unit 10 and the track grooves 1a of the rail 1 in this manner.

Figure 3:
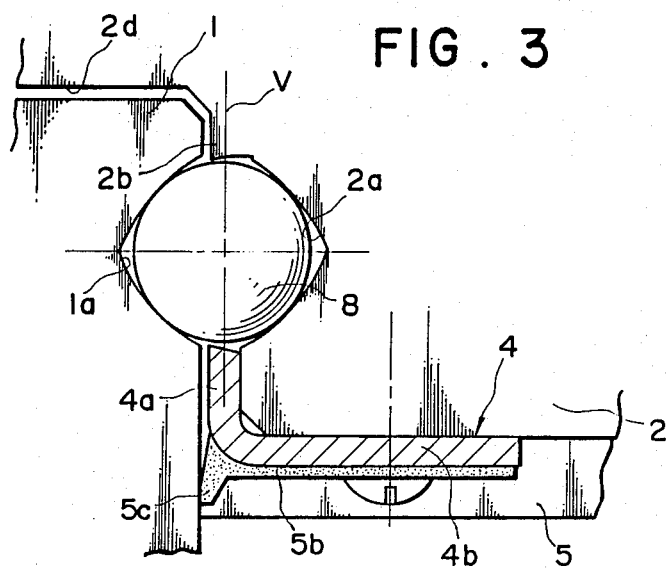
FIG. 3 is an enlarged diagram showing the portion around a ball in a load range in FIG. 2.

FIG. 3 is an enlarged diagram of the portion around the ball in the load range in FIG. 2. The track grooves 1a and 2a are formed so as to have substantially a V shape. The track surfaces are formed by arc surfaces, thereby obtaining load capacitance larger than that in the case of the flat surfaces.

A holding portion 2b projecting to the side of the rail 1 rather than a perpendicular v passing through the center of the ball 8 which slides along the track groove 2a is formed on the upper edge surface of the track groove 2a of the casing 2. The lower edge surface of the track groove 2a on the side opposite to the upper edge surface is formed on the side of the casing 2 rather than the perpendicular v.

In this manner, by forming the front edge portion of the lower track surface of the track groove 2a on the side of the slide unit so as to be remote from the perpendicular v, a grindstone can more easily enter the track groove 2a upon grinding work, so that the working efficiency is improved. As the track surfaces are nearly parallel with the axis of the grindstone, it is advantageous in working.

A holding plate 4 having an almost L-shaped cross section is fixed to the lower edge surface of the track groove 2a. A holding portion 4a formed on the rail side is formed so as to have a plate thickness so as to approach the position projecting than the perpendicular v.

As mentioned above, both of the upper and lower edge surfaces of the track groove 2a are projected to the side of the rail 1 rather than the perpendicular v and the minimum distance between the upper and lower edge portions of the track groove 2a is slightly smaller than the diameter of the ball, so that the balls 8 can be held.

The holding plate 4 is attached to the lower surface of the casing 2. A lower surface seal 5b having a seal lip 5c adapted to be come into contact with the rail 1 is fixed to an attaching portion 4b of the holding plate 4 by a working method such as baking or the like.

In general, the holding plate 4 is made of steel and the lower seal 5b is made of plastics. However, they can be made of other materials.

FIG. 4 shows the second embodiment of the invention. In the first embodiment, the lower seal and holding plate are separately formed and the balls 8 are held by the holding portion 2b of the track groove 2a and the holding plate 4. However, in the second embodiment, the seal and holding plate are integrally molded by the same material to thereby form the integrated holding plate 4. The balls 8 are held by three members consisting of the holding portion 2b of the track groove, the holding plate 4, and a holding band 7. Therefore, the minimum width between the holding portion 2b and the holding plate 4 is set to be larger than the ball diameter.

The holding plate 4 is ordinarily made of plastics having an intermediate hardness between the rubber and the synthetic resin because it has the elastic seal lip 5c and the holding portion 4a to hold the balls 8.

FIG. 5A is a perspective view of the holding plate in the first embodiment of the invention. The seal lip 5c and holding plate 4 are separately formed by the different parts and these two parts are fixed by baking or the like.

FIG. 5B is a perspective view of the holding plate in the second embodiment. The portion of the holding plate and the portion of the seal lip are integrally formed by injection molding elastic plastics.

As mentioned above, according to the invention, there is provided a holding device for holding the rolling members such as balls arranged in the track grooves of the saddle-shaped slide unit, wherein the track grooves can be easily finished at a high accuracy and the rolling members can be certainly held.

Further, the holding plate is formed so as to have an almost L-shaped cross section and the seal lip is formed to the attaching portion on the side opposite to the holding portion and used as the lower surface seal, thereby enabling the holding plate of the rolling members and lower surface seal to be integrally formed as a small part.

Although the balls have been used as the rolling members in the foregoing embodiments, rollers can be also used. In addition, although the number of tracks along which the balls move has been set to two, the invention can be also easily applied to the case where four tracks are formed.

In the embodiments, the track grooves have been formed on the vertical surfaces of the rail and slide unit. However, the invention can be also easily applied to a rectilinear motion rolling guide unit in which the track grooves are formed on the slant surfaces.

The present invention is not limited to the foregoing embodiments but many modifications and variations are possible within the spirit and scope of the appended claims of the invention.

What is claimed is:

1. In a two-way loader type linear bearing having a sliding unit atop a rail with corresponding grooves in parallel sides of the sliding unit and the rail forming a path for ball bearings, the improvement wherein the portions of said sliding unit above each of said grooves extends towards the rail beyond the vertical plane passing through the center of the ball bearings, and wherein the portions of said sliding unit below each of said grooves terminates short of said vertical plane.

2. A holding device of a rectilinear motion rolling guide unit, comprising:

a long rail;

first track grooves formed on both side wall surfaces in the longitudinal direction of said rail;

a saddle-shaped slide unit which is formed with an inner concave portion and is slidably mounted on said rail;

second track grooves formed on the surface of said inner concave portion at the positions opposite to said first track grooves of the rail;

a number of rolling members inserted between the first and second track grooves, thereby enabling the slide unit to be slidably moved on the rail in the longitudinal direction thereof through the rolling of said rolling members;

a holding portion to hold the rolling members formed at the inner concave portion of the slide unit so as to project beyond the rail side of a bisector which passes through the center of the rolling member arranged between the first and second track grooves and which divides the first and second track grooves between the rail side and slide unit side; and a holding plate formed at the inner concave portion in the direction opposite to said holding portion so as to be located on the slide unit side of said bisector, and said holding plate is fixed to the inner concave portion so as to be projected to the side of the rail by exceeding said bisector, whereby the rolling members are held between said first and second track grooves by at least the holding plate and holding portion.

3. A holding device according to claim 2, wherein said holding plate has an almost L-shaped cross section and includes an attaching portion, and a lower surface seal having a seal lip is integrally fixed to the attaching portion.

4. A holding device according to claim 3, wherein said holding plate with the lower surface seal is made of a same material by injection molding.

5. A holding device according to claim 2, wherein said rolling members are balls.

6. A rectilinear motion rolling guide comprising:

a rail having a pair of parallel spaced-apart first sides each having a groove therein;

a saddle-shaped sliding unit slidably mounted atop said rail and having an interior pair of spaced-apart second sides parallel to said first sides, each facing the corresponding one of said first sides and having a groove therein cooperating with the groove of said first side to form a path for said rolling members;

plural rolling members;

each of said second sides having an upper and a lower portion, atop and below said second groove, respectively, with said upper portion extending toward said first sides beyond the vertical plane passing through the center of said rolling members when in said path and with said lower portion terminating short of said vertical plane;

said upper portion has a first holding projection; and a pair of holding plates removably affixed to said sliding unit, each having a leg parallel to and abutting said lower portion with the surface thereof nearest said first surface extending beyond said vertical plane, each of said legs having a second holding projection, whereby said first and second holding projections hold said rolling members in said path.

7. The guide as defined in claim 6 wherein each of said holding plates is L-shaped, includes an attaching portion and includes a lower surface seal having a seal lip in contact with one of said first sides.

8. The guide as defined in claim 7 wherein each of said holding plates is formed by injection molding.

9. The guide as defined in claim 6 wherein said first and second grooves are generally V-shaped, with arcuate sides.

* * * * *